Dec. 9, 1958 — T. TINKER — 2,863,648
HIGH PRESSURE CLOSURE
Filed Dec. 2, 1955 — 2 Sheets-Sheet 1

INVENTOR.
Townsend Tinker
BY
Bean, Brooks, Buckley & Bean
ATTORNEYS.

Dec. 9, 1958 T. TINKER 2,863,648
HIGH PRESSURE CLOSURE
Filed Dec. 2, 1955 2 Sheets-Sheet 2

INVENTOR.
Townsend Tinker
BY
Bean Brooks Buckley & Bean
ATTORNEYS.

United States Patent Office 2,863,648
Patented Dec. 9, 1958

2,863,648

HIGH PRESSURE CLOSURE

Townsend Tinker, Orchard Park, N. Y., assignor to American Radiator & Standard Sanitary Corporation, New York, N. Y., a corporation of Delaware Application December 2, 1955, Serial No. 550,648

2 Claims. (Cl. 257—221)

This invention relates to closures for pressure vessels and more particularly to covers or closure members for high pressure heads for heat exchangers and similar apparatus.

The problem of sealing vessels against high internal pressures by means of removable closure heads has been the subject of a great deal of design and research activity. Due to the extremely high internal pressures encountered in many pressure vessels of the present day the problems of maintaining an adequate seal and distributing and transmitting the stresses resulting from the high internal pressures present many problems.

It has heretofore been proposed to provide inner and outer closure or cover members with an open fluid pressure connection between the interior of the vessel proper and the space between the inner and outer cover members. In this way the inner cover member is in a state of hydrostatic pressure equilibrium so that the means employed for pressuring a gasket between the inner cover member and the vessel proper does not have to bear the force of the internal pressure in the vessel which acts against the cover means generally in one way or another. Despite the obvious theoretical advantage afforded by this type of design, it has not been adopted to as great an extent as might be in the practical art of very large pressure vessels which carry extremely high internal pressures.

The present invention provides high pressure closure organizations which afford the advantages of the general idea and arrangement of having an inner gasket pressing or seal means which is not subjected to the main outward pressure force of the fluid within the vessel and which at the same time afford other important practical advantages, particularly as to structural simplicity. In the arrangement of the present invention the gasket pressure means, while not subject to the hydrostatic pressure force of the vessel, is accessible from the exterior of the vessel for adjusting gasket pressure and the like.

In its primary form the present invention provides a novel diaphragm and gasket sealing arrangement wherein the outward force of the fluid pressure within the vessel is transmitted to the outer cover member in a manner which permits no fluid pressure escape at or about the outer cover member, the gasketed joint or primary pressure sealing means being directly between the diaphragm and the pressure vessel proper. Furthermore, the holding means for such sealing or gasket means is substantially free of the main fluid pressure force within the vessel. The diaphragm arrangement of the present invention completely isolates the fluid within the vessel from the outer cover. The outer cover requires no sealing or gasket arrangement of any kind.

The outer cover retaining arrangement of the present invention is such that the large outward forces received thereby from the aforesaid diaphragm are transmitted to the vessel proper by a threaded connection between the outer cover member and the vessel body. While the gasket pressuring means is accessible and available at the outside of the outer cover member in certain embodiments of the present invention, there is no need for registry as between the outer cover member and the underlying parts and the outer cover member may be threaded into the vessel to the proper depth without regard to its angular position.

Furthermore, and again referring more particularly to certain embodiments of the present invention, the gasket pressuring means requires no tapping of the gasket seating flange and such flange may accordingly be just wide enough to receive a proper gasket, thus providing a vessel head of maximum compactness for a given usable inside diameter and pressure.

In its broadest aspect the present invention provides a closure wherein a diaphragm transmits the hydrostatic pressure load to a cover member and wherein such diaphragm serves directly as the gasket or seal engaging member, there being means provided for bearing directly against the diaphragm to exert sealing pressure against the gasket or other seal device. In certain embodiments of the invention the pressure exerting means is accessible from outside of the closure means.

In one embodiment of the present invention the diaphragm is annular in form and attached to the inner face of the main or outer cover member, so that the diaphragm effects the seal as in the other embodiments whereas the major part of the internal hydrostatic pressure load is applied directly to the main or outer cover member.

In general, the diaphragm members of closures of the present invention have plain outer margins or peripheries which are readily assembled in effecting the closure, without welding such outer margins to the vessel proper or to other cooperating parts of the closure.

The closure means of the present invention, as exemplified in the various embodiments set forth herein and illustrated in the accompanying drawings, is characterized by marked simplicity, the parts thereof being economical to manufacture, few in number, and easy to assemble. Due to the extreme service conditions which such closures must meet successfully, they are usually complex and expensive and require rather involved assembling procedures.

Further objects and advantages of the present invention will appear from a study of the following description of the various embodiments, taken in conjunction with the accompanying drawings. While various embodiments of the present invention are disclosed herein by way of example and illustration, it is to be understood that the present invention is not limited thereto and that various mechanical modifications may be made therein without departing from the principles of the invention, the latter being limited only as defined in the appended claims.

In each of the several embodiments the drawings illustrate what may be considered to be the upper left-hand corners of vertically extending cylindrical pressure vessels. Reference will first be had to the form of the present invention illustrated fragmentarily in Fig. 1.

Figure 1:
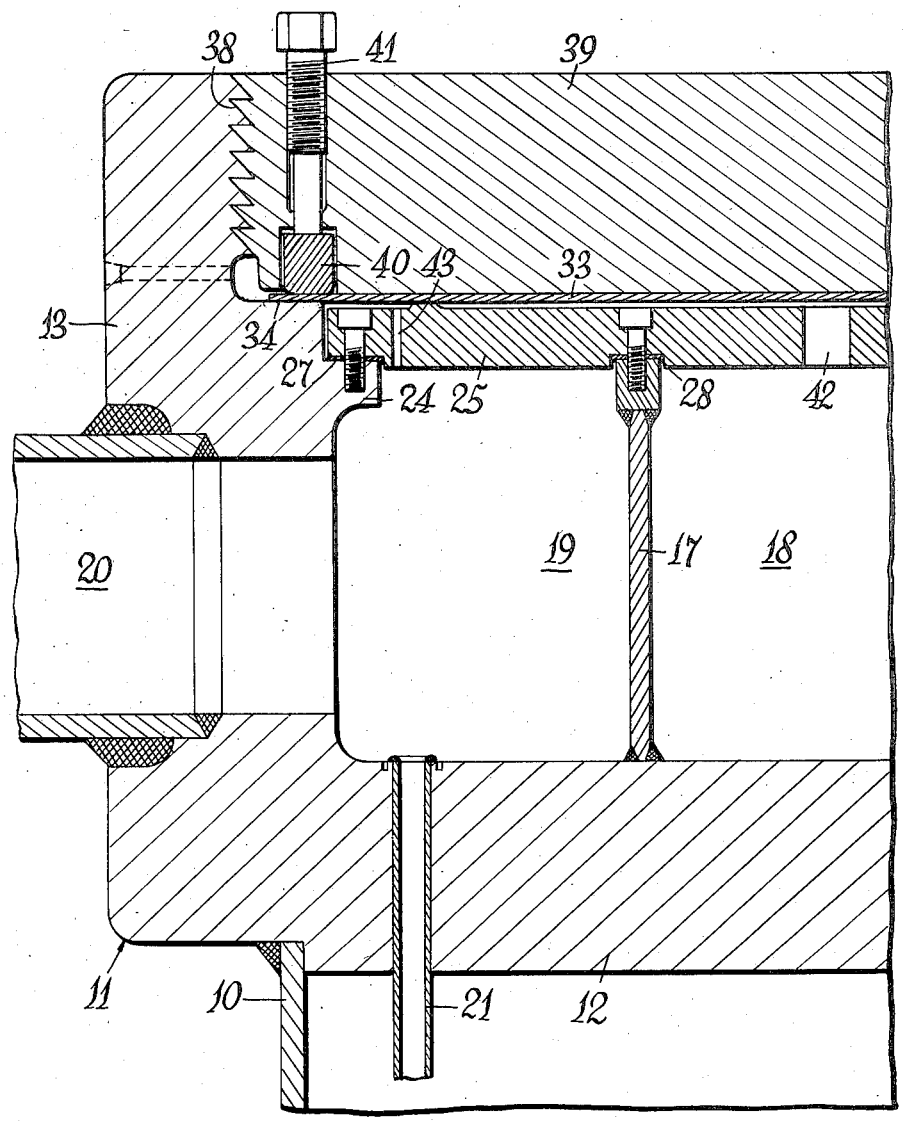
Fig. 1 is a fragmentary cross sectional view taken longitudinally through a corner of a pressure vessel provided with one form of the closure means of the present invention.

In Fig. 1 the numeral 10 designates a fragmentary upper corner portion of a main hollow cylindrical body member and a head member welded to the upper end thereof is designated generally by the numeral 11. The head member 11 comprises a radial wall portion 12 which in the present instance comprises a tube sheet for a tube type heat exchanger. The head member 11 further includes a cylindrical portion 13 which extends axially outwardly from the pressure vessel proper (upwardly as viewed in Fig. 1). A conventional pass plate or pass rib 17 is welded within the interior of head member 11 and divides the same into an inlet pass portion 18 and an outlet pass portion 19. An outlet passage is indicated at 20 in Fig. 1 and a similar inlet passage is provided at the opposite side of head member 11.

Pressure fluid such as high pressure water or superheated steam enters the inlet pass portion 18 and passes to the outlet pass portion 19 by way of a plurality of tubes which are fixed in tube sheet 12 in conventional manner. Merely by way of example the numeral 21 in Fig. 1 designates one of the heat exchange tubes of the apparatus. All of the foregoing is generally conventional construction in high pressure heat exchanger vessels of this general class and is well known to those skilled in the art to which the present invention relates.

Adjacent to the upper or outer end of the inlet and outlet pass portions 18 and 19, the interior of head member 11 is provided with a ledge formation 24 which provides an annular seat for a backup plate or inner cover member 25. In the present instance backup plate 25 serves as a gasket sealing pass rib sealing cover to cooperate with pass rib 17 in dividing or separating inlet pass portion 18 and outward pass portion 19. Inner cover member 25 seats on the ledge 24 through the medium of a sealing gasket 27 and a similar sealing gasket or web portion 28 is interposed between inner cover 25 and the upper edge of pass plate or pass partition 17.

A diaphragm 33 overlies inner cover member 25 and extends over a further annular ledge formation 34 formed interiorly of head member 11 and seats marginally upon such ledge.

The interior of cylindrical portion 13 of the head member 11 outwardly of ledge 24 is provided with internal buttress threads as at 38 in Fig. 1 and a rigid outer cover member 39 is peripherally threaded to engage the internal threads 38. Outer cover member 39 is screwed into such position that its inner radial face substantially abuts the upper surface of diaphragm 33. It will be seen from the following that this threaded connection of outer cover member 39 is outside of and protected from the pressure fluid in the vessel by the hermetic seal formed by the seating of diaphragm 33 against ledge 34. The manner in which sealing pressure is applied to the diaphragm will now be described.

The under side of outer cover member 39 is formed with an annular recess which receives a compression ring 40. A series of screws 41 thread into outer cover member 39 with their heads accessible at the exterior thereof and bear against compression ring 40 as clearly shown in Fig. 1. The latter in turn bears directly against sealing diaphragm 33 and thus any desired degree of sealing pressure may be applied by tightening the screws 41. It will be noted that diaphragm 33 is a plain flat disc, requiring no special forming, reinforcing or securement, such as welds or the like, and no separate gasket means.

One or more openings 42 in inner cover member 25 establish equal hydrostatic pressures above and below the inner cover member at the inlet pass portion side of the head member 11. Thus, the inner cover member and its gasket means provide a fluid seal as between inlet pass portion 18 and outlet pass portion 19 without bearing any portion of the major hydrostatic pressure load within the vessel generally and the pass portions in head member 11. Diaphragm 33 provides a hermetic seal for the head space comprising the inlet and outlet pass portions and the space above the inner cover member 25.

A metering orifice 43 in inner cover member 25 provides for fluid circulation between the inner cover member 25 and diaphragm 33 in a manner and for a purpose which is more fully described in my copending application filed of even date herewith and which detailed description will not be repeated here.

Figure 2:
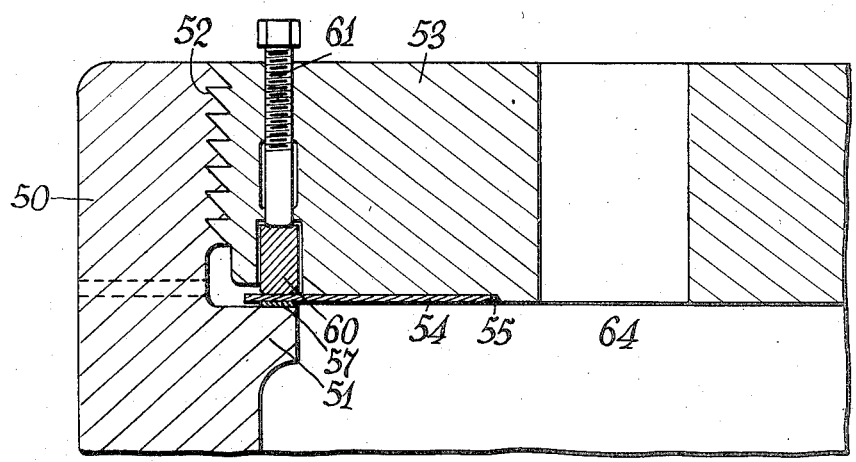
Fig. 2 is a similar view of a modified form of the closure means of the present invention.

The modification of Fig. 2 is generally the same as that of Fig. 1 excepting for the fact that only a partial annular diaphragm is employed, the same being sealed at its inner diameter directly to the inner wall of the outer cover. In Fig. 2 the inlet and outlet pass chambers are not shown and they may in fact not be present. In the alternative, the pass chambers may be present and provided with an inner cover or pass rib sealing plate as in the embodiment of Fig. 1 or the inlet and outlet pass chambers may be divided by welded cover means extending over both chambers or over only one of them. Only the outer cover means is illustrated in Fig. 2 but the means there shown may comprise the complete closure.

In Fig. 2 the outer cylindrical end of a head member or vessel proper is designated 50 and is provided with an internal ledge 51 and, outwardly thereof, with internal buttress threads 52. An outer cover member 53 has complementary peripheral threads and is annularly recessed at its inner face to receive an annular plate or diaphragm member 54. The inner diameter of diaphragm 54 is welded at the inner edge of the annular recess as at 55, so that the lower face of the diaphragm and the main lower face of cover member 53 are flush in the illustrated instance. The outer portion of annular diaphragm 54 is thus free and flexible and seats against a gasket or seal member 57 which, in turn, seats on ledge 51.

As in the previous embodiment, the under side of cover member 53 is formed with an annular recess which receives a compression ring 60. A series of screws 61 thread into outer cover member 53 with their heads accessible at the exterior thereof and bear against compression ring 60 as shown in Fig. 2. The latter in turn bears directly against the free marginal edge portion of annular diaphragm 54 and through it against the gasket or seal 57, and thus here again any desired degree of sealing pressure may be applied with the closure completely assembled merely by tightening the screws 61.

The modification of Fig. 2 permits fluid connection to be made to the interior of the pressure vessel directly through the cover member 53, as indicated at 64, without in anyway interfering with the closure itself or the efficacy of the seal provided thereby or the efficiency of distribution of the hydrostatic pressure load.

Figure 3:
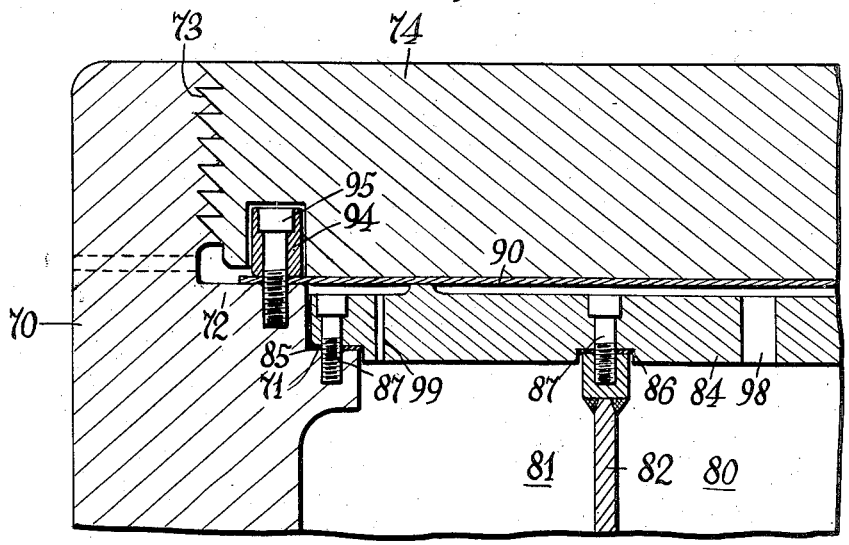
Fig. 3 is a view similar to Figs. 1 and 2 showing a further embodiment of the invention.

In the embodiment of Fig. 3 the diaphragm is pressured by screws which are entirely independent of the main or outer cover member and thread directly into the diaphragm supporting ledge of the head member of the vessel proper. As in the other embodiments illustrated in the drawings and described herein, the diaphragm serves the dual function of a pressure transmitting diaphragm and a gasket or seal means.

Referring now to Fig. 3 of the drawings, the outer cylindrical end of a head member or vessel proper is designated 70 and is provided with a pair of stepped annular interior ledges 71 and 72. Outwardly of the pair of ledges cylindrical end 70 is provided with internal buttress threads as at 73 and an outer cover member 74 has complementary peripheral threads for engagement therewith.

The interior of the head member may comprise an inlet pass portion 80 and an outlet pass portion 81 separated by a pass plate 82. A pass rib or pass plate cover 84 seats on ledge 71 and upon the upper end of pass plate 82, gaskets 85 and 86 being interposed between the pass plate cover and ledge 71 and pass plate 82, respectively.

Screws 87 thread into ledge 71 and pass plate 82 to pressure the gaskets and retain the pass plate cover 84 in assembled position.

A diaphragm 90 overlies pass plate cover member 84 and seats on ledge 72. A compression ring 94 bears against the upper marginal surface of diaphragm 90 and is removably and adjustably held in compressing relationship by a series of screws 95 which thread into ledge 72. The under side of outer cover member 74 is provided with an annular groove 96 which fits loosely over compression ring 94.

As in the embodiment of Fig. 1, pass plate cover 84 is provided with a pressure equalizing passage 98 at the inlet pass side thereof and a restricted orifice 99 at the outlet pass side. The purposes and functioning of passage 98 and orifice 99 are the same as in the embodiment of Fig. 1.

I claim:

1. In a closure for vessels containing fluid under pressure, a head member having an outwardly opening cylindrical portion comprising inlet and outlet pass portions and a pair of coaxial stepped internal annular ledges at the outer ends of said pass portions, said cylindrical head portion being internally threaded outwardly of said ledges, an outer cover member having peripheral threads for engagement with said internal threads, an inner pass cover member seating on the inner of said ledges in sealing relation therewith, a diaphragm having a free annular outer marginal portion seating on the outer of said ledges and a compression ring seating against the outer surface of said annular marginal portion, and screw means acting on said compression ring to clamp said outer marginal diaphragm portion against said outer ledge in sealing relation therewith, the portion of said diaphragm radially inwardly of said annular marginal portion being in surface abutment with said outer cover member whereby outward fluid pressure against said inner diaphragm portion is transferred directly to said outer cover member.

2. Pressure vessel means and a removable closure therefor, said pressure vessel having an outwardly opening end portion and a pair of coaxial stepped internal annular ledges spaced inwardly of the outer end thereof, an outer cover member having releasable interfitting connection with said pressure vessel at its open end, an inner cover member secured to the inner of said ledges in sealing relation therewith, a diaphragm having a free flexible annular outer marginal portion seating on the outer of said ledges and a compression ring seating against the outer surface of said annular marginal portion, and screw means acting on said compression ring to clamp said outer marginal diaphragm portion against said outer ledge in sealing relation therewith, the portion of said diaphragm radially inwardly of said annular marginal portion being in surface abutment with said outer cover member at the inner face of the latter whereby outward fluid pressure against said inner diaphragm portion is transferred directly to said outer cover member.

References Cited in the file of this patent

UNITED STATES PATENTS

| 2,009,877 | Dodd | July 30, 1935 |
| 2,690,276 | Alt | Sept. 28, 1954 |

FOREIGN PATENTS

| 455,784 | Canada | Apr. 5, 1949 |
| 726,709 | Great Britain | Apr. 2, 1953 |